INVENTORS
RICHARD REUT
BRUCE H. BALDRIDGE
BY David E. Hoppe
ATTORNEY

INVENTORS
RICHARD REUT
BRUCE H. BALDRIDGE
BY David E. Hoppe
ATTORNEY

INVENTORS
RICHARD REUT
BRUCE H. BALDRIDGE
BY David E. Hoppe
ATTORNEY 3,377,623
PROCESS BACKUP SYSTEM
Richard Reut, Medfield, and Bruce H. Baldridge, Natick, Mass., assignors to The Foxboro Company, Foxboro, Mass., a corporation of Massachusetts
Filed Sept. 29, 1965, Ser. No. 491,307
4 Claims. (Cl. 340—172.5)

ABSTRACT OF THE DISCLOSURE

A dual computer configuration adapted for process control applications utilizes at least one switchable data bus having process control modules interconnected therewith; an external system check device monitors selected computer and peripheral conditions and orders data bus connection to the alternate computer in accordance with fault occurrence; normally, both computers, each servicing its respective data bus, are operational; an alternate configuration provides for critical loop control redundancy, the normal condition finding all computers operational.

---

This invention relates to process control systems and more particularly to a computerized process control system having a backup facility.

Rather than employing an idle redundant computer on stand-by, the present invention addresses itself to the problem of obtaining maximum efficiency compatible with requisite backup provisions.

Accordingly, it is an object of this invention to provide computer backup means for a process in which all computers employed are assigned working functions under normal operation.

It is another object of this invention to provide a means of maintaining requisite process loops under conditions of computer failure.

It is another object of this invention to provide a means of maintaining a specified number of process loops under certain conditions of computer peripheral equipment failure.

Another object of this invention is to provide an efficient means of employing two computers in a process control configuration while providing for an emergency mode of operation controlling the process should a computer fail.

Another object of this invention is to provide for critical loop output redundancy while efficiently utilizing the capacities of a plurality of computers.

Another object of this invention is to provide for a multiple-computer control system having facilities to take over essential input-output functions as required by the availability status of the computers.

Another object of this invention is to provide for changeover of computer control with respect to input-output functions of a process while insuring against accidental switching of programming between computers.

Another object of this invention is to provide a multiple computer switching scheme having inherent input-output isolation between computers in normal operation.

Another object of this invention is to provide an emergency switching arrangement for a multiple computer process control that preserves program isolation and integrity of the individual computer against any possible accidental manipulation by an operator during normal operation and that allows computer control changeover of input-output functions only upon detection of predetermined non-operative parameters.

Another object of this invention is to provide a class of multiple-computer control systems designed to provide high reliability and efficiency while incorporating means to preserve input-output integrity of each computer from any possible accidental manipulation via another computer's input-output facilities.

Another object of this invention is to provide for a multiple computer control scheme in which one computer normally controls a process and a second normally controls supervisory functions and under conditions of a computer failure the surviving computer is made available to maintain predetermined emergency process control as well as selected supervisory functions.

These and other objects and advantages of the invention are apparent from the following specification taken in conjunction with the drawings in which.

Figure 1:
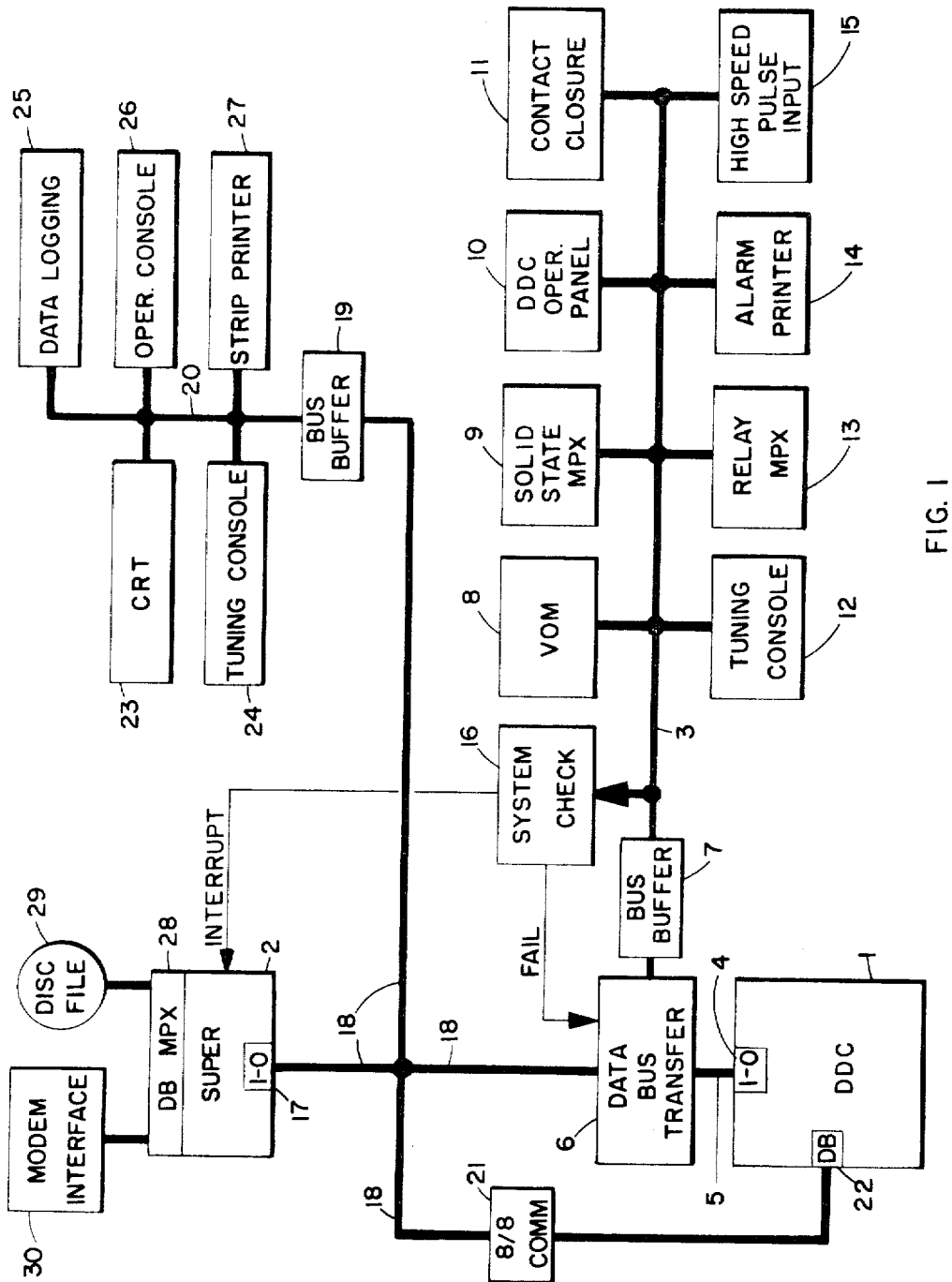
FIGURE 1 is a block diagram of a two computer process control and supervisory system providing for the assumption by the supervisory computer of process control.

Referring to FIGURE 1, a block diagram of an embodiment of the invention is shown wherein a supervisory computer may be enabled to perform selected functions of direct digital control during times a direct digital control computer is not completely functioning. The system of FIGURE 1 employs a direct digital control computer 1 and a supervisory computer 2 in a configuration adapted to provide maximum reliability for a process control system. Direct digital control computer 1 provides control of a process via a data bus 3 which illustratively consists of a 50-wire signal transmission facility to which system modules are connected in parallel. Direct digital control computer 1 is connected via its input-output facility through bus section 5 to data bus transfer switch 6, which in its DDC normal operating mode transmits all information between input-output facility 4 and the DDC modules connected in parallel thereto via bus buffer 7. Illustratively, DDC modules connected to the DDC data bus 3 include valve output module 8, solid state multiplexer analog input module 9, direct digital control operator's panel 10, contact closure module 11, process tuning console modules 12, relay multiplexer analog input module 13, alarm printer module 14, and high speed pulse input module 15. In addition, for the carrying out of the invention a system check module 16 is connected to bus 3 for checking system operation. Additional inputs to the system check module 16 may be provided, such as power supply checks not normally available on the data bus.

Supervisory computer 2 in the configuration of FIGURE 1 is connected to a data bus controlling supervisory functions. In addition, supervisory computer 2 is connected into data bus transfer module 6 for the purpose of assuming control of the DDC portion of the data bus 3 during such times as DDC computer 1 is not functioning satisfactorily. Supervisory computer 2 is connected through its input-output facility 17 to bus 18, which illustratively consists of a 50-wire data transmission cable. Bus 18 is connected in parallel to data bus transfer switch 6 and to bus buffer 19. In addition, bus 18 is connected through computer communication module 21 to the data break facility of direct digital control computer 1. The section of bus 18 connected to bus buffer 19 is connected therefrom to supervisory section 20 of the bus, to which modules performing supervisory functions are connected in parallel. Illustratively, connected to bus 20 are: cathode ray tube display module 23, tuning console module 24, data logging module 25, operator's console module 26 and strip printer 27. It is to be understood that the supervisory functions are not limited by those enumerated above, but may include any function needed or required. For example, the supervisory computer may be employed to compute set point changes or special purpose algorithms, such as feed-forward and non-interacting, for transmission through the communications module 21 to the DDC computer 1.

Supervisory computer 2 illustratively has a data break multiplexer facility 28, providing a multiple-access data transfer means, to which are connected disc file 29 and modem interface 30.

In the normal operation of the process, DDC computer 1 is connected through data bus transfer switch 6 to bus 3 and the DDC-operating modules connected thereto. This portion of the system incorporates periodic sensing of input transducers by means of analog input modules 9 or 13. Modules 9 and 13 provide in sequence the sampled data in binary form to DDC computer 1 for processing appropriate control actions based thereon. The appropriate control action is periodically transferred through the valve output module 8 to the appropriate valve. Other DDC functions as required may be employed, such as contact closure monitoring, control law tuning, pulse counting, and alarm monitoring based on deviation limits.

In normal operation supervisory computer 2 operates supervisory functions 23 through 27 via bus 18, while that portion of bus 18 terminating at data bus transfer switch 6 remains effectively disconnected. In addition, in normal operation, the supervisory computer 2 may communicate any type of information through communication module 21 directly to the data break facility 22 of computer 1.

General business information may be communicated via interface 30 through the data break multiplexed facility 28 of computer 2; and data may be transferred in and out of computer 2 via facility 28 from the disc file 29 also.

In the event of a direct digital control computer malfunction, or any abnormal operation monitored by system check module 16, the system check module 16 will generate a fail signal which activates the data bus transfer switch 6 to transfer operation of DDC data bus 3 away from DDC computer 1 and to supervisory computer 2 instead. System check module 16 also generates an interrupt signal applied to supervisory computer 2 which informs computer 2 of the new mode of operation and thereby initiates computer 2 processing in accord therewith. Supervisory computer 2 in the fail mode of operation continues to operate such supervisory functions as may be selected by predetermined program and in addition now controls the DDC portion of the data bus and the DDC modules 8 through 15 connected therethrough in a manner determined by appropriate programming. For this fail mode of operation, it is illustratively convenient to take from disc file 29 and transfer to core memory of the supervisory computer 2 a reserve program efficiently designed to meet the necessary requisites of the fail mode of operation. This reserve program may be redundantly stored on opposite faces of the magnetic disc to insure its availability and integrity when called for transfer into core memory of computer 2.

In the embodiment of FIGURE 1, it is to be noted that system check module 16 is integrated into the control system in a manner such that supervisory computer 2 cannot connect through data bus transfer switch 6 to the DDC portion of bus 3 unless a fail signal has been generated in due course of malfunction detection. This prevents instructions from the supervisory computer from reaching the DDC input-output modules 8 through 15 under normal operating conditions; it also prevents the programmer from inadvertently programming supervisory instructions into the DDC data bus thereby causing faulty operation of a DDC program. Thereby the reliability inherent in having the process section of the computer system backed up by the supervisory computer is further protected and facilitated by the inherent isolation provided between the supervisory and direct digital control programming. Logical connection between the two portions of the system, direct digital control and supervisory, is only possible upon the detection of a system malfunction and the consequent generation of an appropriate fail signal thereupon.

The complete program isolation between the supervisory computer and the direct digital control computer is compatible with the use of Fortran in the supervisory computer with on-line compiling capability while the DDC computer uses machine language direct digital control programs. Full capability of both computers for programming is available at all times.

In normal operation, the supervisory computer and the direct digital control computer may communicate in either direction by means of the communications module 21. Control of the comunications module operation may be illustratively facilitated by way of programmed instructions executed by the supervisory computer.

Restoration of the system to normal operation may be accomplished by an appropriate programming routine initiated by servicing personnel when the direct digital control computer has been restored to operating condition. The servicing routine would in effect load the original program back into the supervisory computer and restore normal control of the process to the DDC computer.

Figure 2:
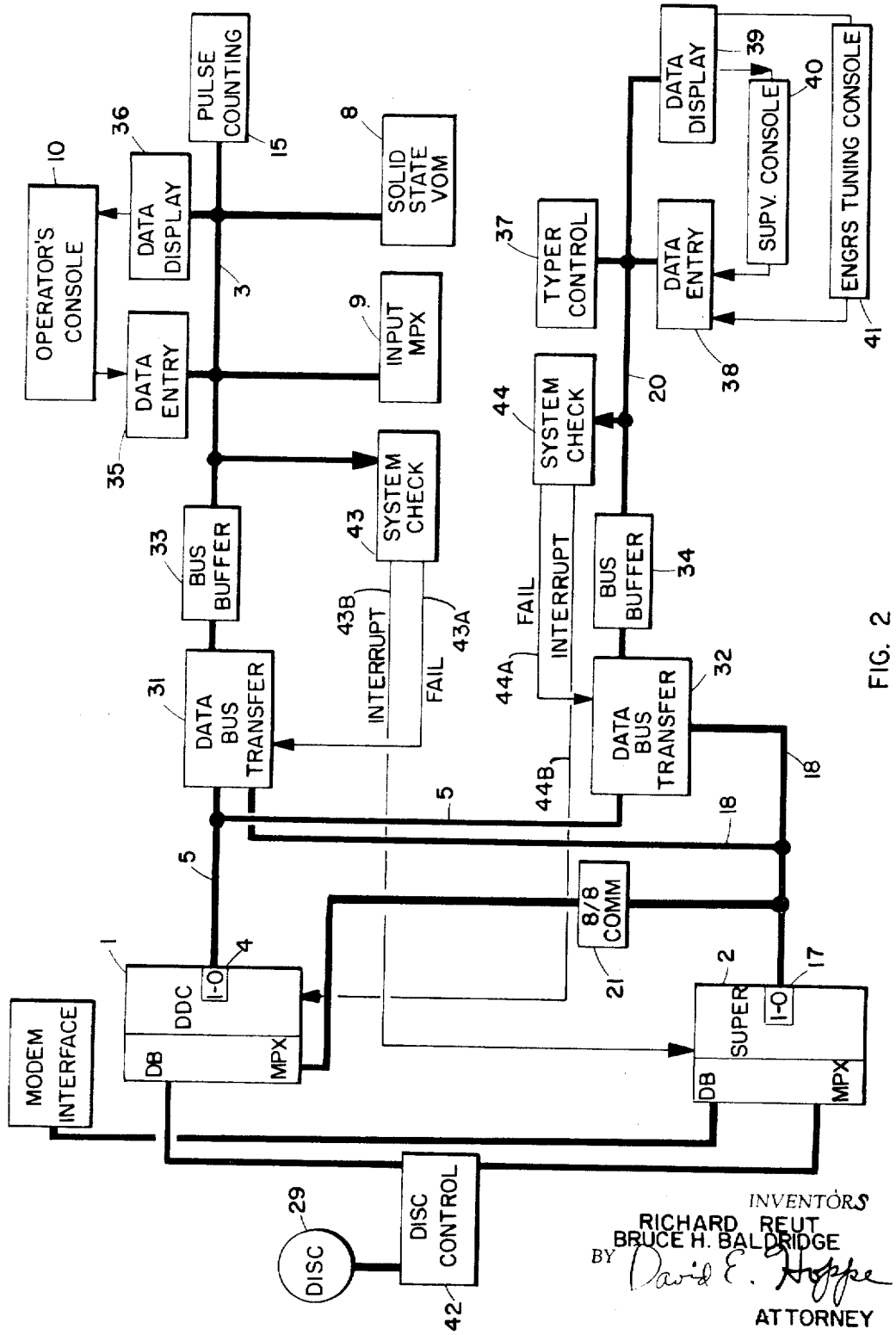
FIGURE 2 is a block diagram of a two-computer process control and supervisory system providing for the assumption of control and supervisory functions by a surviving computer.

Referring now to FIGURE 2, an embodiment of the invention is shown in block diagram form whereby either the supervisory computer 2 or the direct digital control computer 1 may take over control of the entire control-supervisory system as required. In this embodiment, the system functions in two ways as distinguished from the method of operation of the system of FIGURE 1. In the case of this two-way system, if the supervisory computer 2 should fail, direct digital control computer 1 may, according to the appropriate program actuated as a consequence, operate both DDC functions and supervisory functions as desired in the fail mode. Similarly, if the direct digital control computer 1 should fail supervisory computer 2 may control those pre-programmed DDC functions and supervisory functions selected as necessary and desired in the fail mode.

The two-way system employs two data bus transfer switches 31 and 32, whereby control of both the DDC data bus 3 and the supervisory bus 20 may be connected in parallel to either direct digital control computer 1 or to supervisory computer 2 according to which computer is in the operable mode and which computer has failed. The direct digital control computer 1 is connected from its input-output facility 4 through bus 5 to both data bus transfer switches 31 and 32 in parallel, the connection to data bus transfer switch 32 being effectively inoperative in the normal mode of operation. Data bus transfer switch 31 connects the information from direct digital computer 1 through bus buffer 33 to DDC bus 3 and to the direct digital control function modules connected thereto. Illustratively, these include input data multiplexer 9, solid state valve output module 8, pulse counting module 15, and data entry module and data display module 36 for inputting and outputting data from the operator's console 10.

In the same manner, supervisory computer 2 is connected from its input-output facility 17 through bus 18 to both data bus transfer switches 31 and 32 in parallel, the connection of bus 18 to data bus transfer switch 31 being effectively inoperative in the normal mode of operation. The normal operating connection of bus 18 is made by data bus transfer switch 32 through bus buffer 34 to supervisory bus 20 and to the supervisory function modules connected thereto. Illustratively, typer control 37, together with data entry and data display modules 38 and 39 are connected in parallel to bus 20. The data entry and data display modules 38 and 39 input and output data from the supervisory and the engineer's tuning consoles 40 and 41 respectively.

A computer communication module 21 is employed as in the system of FIGURE 1 to transfer data between the computers as desired. This transfer is normally under the control of the supervisory computer and may be made in either direction during the normal mode of operation.

Should the direct digital control computer 1 or necessary appurtenances thereto malfunction, system check module 43 will detect the abnormality and generate a fail signal which is applied to data bus transfer switch 31. This causes data bus transfer switch 31 to sever bus buffer 33 and DDC bus 3 from the DDC computer 1 and to transfer bus buffer 33 and DDC bus 3 to the input-output facility 17 of supervisory computer 2 instead. At the same time, an interrupt signal generated by system check module 43 informs the supervisory computer 2 of the DDC fail mode of operation, and the appropriate predetermined program, which is in either core memory or in the disc file 29, is called into operation. In this manner, both the DDC section and the supervisory section are operated according to the capabilities and capacity of the supervisory computer 2. Programming in the fail mode requires appropriate program instructions to distinguish between those modules on the DDC bus 3 and those modules of the supervisory bus 20, which are all in parallel in the fail mode.

In the same manner, should the supervisory computer 2 fail, system check module 44, which monitors the supervisory bus 20 and related functions, will detect the abnormality and generate a fail signal to switch data bus transfer switch 32. Data bus transfer switch 32 will sever supervisory bus 20 with bus buffer 34 from the supervisory computer 32 and transfer bus buffer 34 with supervisory bus 20 to the input-output facility 4 of direct digital control computer 1. At the same time, system check module 44 generates an interrupt signal informing direct digital computer 1 of the supervisory fail mode of operation, and an appropriate program is called into operation predetermined to operate the required DDC and supervisory modules in the supervisory fail mode of operation. Again, the new program may be already in core memory of direct digital control computer, or all or part of the new program may be called from the disc file 29 to be transferred into the direct digital control computer 1 memory core.

In the configuration of FIGURE 2, the disc control module associated with disc file 29 is responsive to instructions from the supervisory computer 2 or from the direct digital control computer 1, as may be appropriate, to transfer back and forth programs from disc file 29 to the selected core memory.

As in the system of FIGURE 1, the two-way system of FIGURE 2 may perform all of the functions enumerated therefor, and in addition has the capability of carrying on the entire DDC and supervisory systems according to the capability of the surviving computer and its associated programming.

Considerations applied to the system of FIGURE 1 also apply here, such as the provision of a method of connecting the system check modules 43 and 44 such that program isolation integrity is preserved until such time as a malfunction is actually detected and a fail signal is generated thereby. In this manner, the reliability inherent in having two computers, each backing the other up, is protected and facilitated by the fail-safe method employed of actuating the interconnection of the DDC and supervisory buses. As noted above, under normal operation, mistakes made in one bus will not influence the alternate bus to the further detriment of the system.

Figure 3:
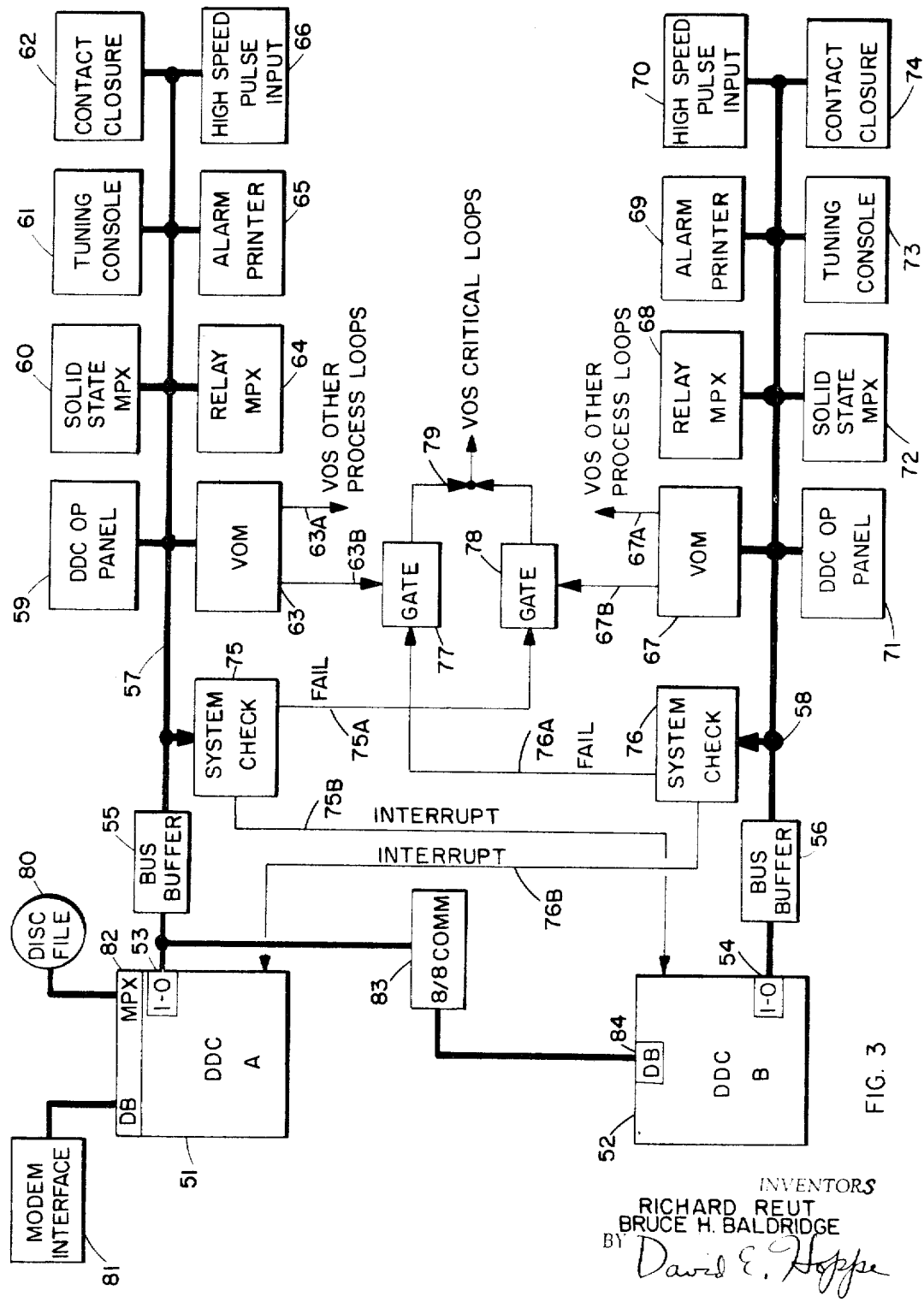
FIGURE 3 is a block diagram of a two-computer process control system providing for control of designated control loops by a supervisory computer.

Referring now to FIGURE 3, a block diagram of an alternative embodiment of the invention employing a pair of direct digital control computers operating a related pair of direct digital control system is shown. Direct digital control computer 51 operates via its input-output facility 53, and bus buffer 55, to a data bus 57, and direct digital control modules 59 through 66 connected in parallel thereto. In a similar fashion, direct digital control computer 52 operates through its input-output facility 54, and its bus buffer 56, to data bus 58, and direct digital control modules 67 through 74, connected in parallel thereto.

Should the direct digital computer 51 operate abnormally, system check module 75 associated with data bus 57 will detect a malfunction and generate a fail signal 75A controlling gate 78 associated with the valve output module 67 of direct digital control computer 52. Under the condition of direct digital control computer 51 failure, valve output module 67 of direct digital control computer 52 will provide the necessary valve control through gate 78 to output 79 directed to the selected valve output stations for process critical loops.

In the case where the number of these critical loops is large and direct digital control computer 52 requires a new mode of operation to comply, system check module 75 may generate an interrupt signal 75B to the DDC computer 52 informing it of the new fail mode of operation.

Conversely, should direct digital computer 52 fail, system check module 76 associated with data bus 58 will generate a fail signal 76A controlling gate 77 associated with the valve output module 63 receiving critical loop valve control information from direct digital control computer 51. Also, system check module 76 may generate an interrupt signal 67B to direct digital control computer 51, informing it of the new fail mode of operation. In this manner direct digital control computer 51 provides control through gate 77 to valve output stations at 79.

Should either computer fail, the valve outputs from the module associated with the inoperative computer will not provide control to those valve output stations supplied therefrom which are not backed up by the alternate valve output module through gates 77 and 78. Thus, it is required to predetermine, from process evaluation, the number of loops that must be controlled under all conditions as distinguished from the loops which may be temporarily left at their last settings, or which may be manually controlled.

As an alternative mode of operation for the system in FIGURE 3, the interrupt signals, 75B and 76B may be omitted and each computer redundantly and simultaneously generate the valve output signals from their valve output modules 63 and 67 respectively, for the designated critical loops. In this case, should one computer fail, the valve commands from the alternate valve output module will be gated to output 79 to continue control. In normal operation, when both computers 51 and 52 are operating satisfactorily, one of the gates 77 and 78 is selected for outputting to critical loops at output 79. Should the computer that is not selected for outputting fail, the system continues to function through the already selected gate in the same manner; should the alternate outputting computer fail, then the gating is switched and the valve outputs are then taken from the operative valve output module and provided to the critical loops.

This system of two direct digital control computers has a computer communication module 83 connected from the input-output facility 53 of computer 51 to the data break facility 84 of computer 52. This allows, in effect, a supervisory type of data transfer controlled by computer 51 in either direction between operating computers. Disc file 80 and modem interface 81 are connected through data break multiplexer 82 to direct digital computer 51.

Figure 4:
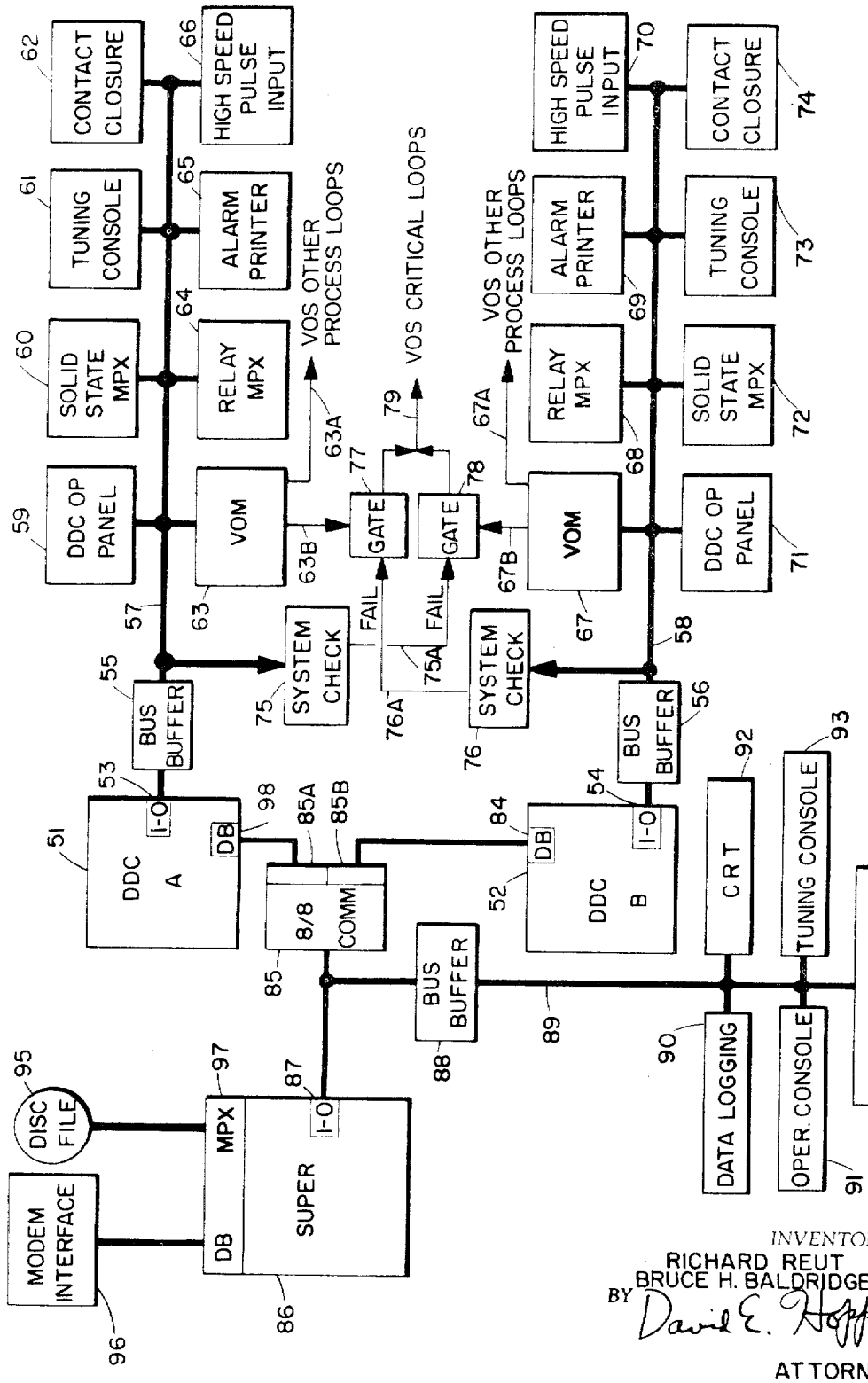
FIGURE 4 is a block diagram of a multiple computer process control and supervisory system providing for control of designated critical loops by a surviving computer.

Referring now to FIGURE 4, the system therein is in general similar to the system configuration of FIGURE 3, with the addition of a third computer for supervisory functions associated with the two direct digital control computers 51 and 52. Supervisory computer 86 may control through its input-output facility 87 a supervisory bus 89 and supervisory modules and functions connected thereto, 90 through 94, as well as communicating through communications module 85 and sub-components therewith, 85A and 85B, with the data break facilities 98 and 84 respectively, of computers 51 and 52. In this manner, the supervisory computer 86 may transfer information to or from either direct digital control computer, as well as operate supervisory functions. In addition, the supervisory computer 86 controls disc file 95 and modem interface 96 connected to the supervisory computer through data break multiplexer 97.

The system in FIGURE 4, may operate in other respects in the same way as the system in FIGURE 3 or in the alternative, provision may be made for transferring additional program information to a surviving direct digital control computer, to enable it to control a preselected larger portion of the process. That is, the number of critical loops selected from continual backup may be greater than the capacity of either computer under normal operation under the stringencies of an emergency program eliminating some of the DC functions, such as the alarm printer, or other functions deemed not necessary under emergency operation. In this manner, a single DDC computer may operate a substantial number of loops through the gating system described above.

As a further alternative, supervisory computer 86 may be provided with a data bus transfer switch configuration in a manner similar to that shown in FIGURES 1 and 2, whereby the supervisory computer 86 may take over the function of an inoperative DDC computer. In this alternative, double backup obtains in that the process may essentially function in the same manner as in normal operation, except for possible reduced supervisory functions, so long as any two of the three computers associated with the system survive.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A high-reliability computer system for controlling an industrial process comprising:
   a first computer having a first input-output facility,
   a first data input-output bus electrically interconnected with said first input-output facility of said first computer and having a first set of data input and data output modules inter-connected in parallel therewith,
   a second computer having a second input-output facility, a second data input-ouput bus having a second set of data input and data output modules for direct digital control of a process interconnected in parallel with said second data input-output bus,
   a data bus transfer switch interconnecting said second data input-output bus with a selected one of said first input-ouput facility of said first computer and said second input-output facility of said second computer, and
   a system check module responsive to said second data input-ouput bus having a first output signal controlling the selection of said data bus transfer switch and having a second output signal informing said first computer of the mode of operation according to the said selection of said data bus transfer switch.

2. A high-reliability system for controlling an industrial process comprising:
   a first computer having a first input-output facility, a first data input-output bus having a first set of data input and data output modules interconnected in parallel therewith,
   a second computer having a second input-output facility, a second data-input-output bus having a second set of data input and data output modules interconnected in parallel therewith,
   a first data bus transfer switch interconnecting said first data input-output bus with a selected one of said first input-output facility of said first computer and said second input-output facility of said second computer,
   a second data bus transfer switch interconnecting said second data input-output bus with a selected one of said first input-output facility of said first computer and said second input-output facility of said second computer,
   a first system check module responsive to said first data input-output bus having a first output signal controlling the selection of said first data bus transfer switch and having a second output signal informing said second computer of the mode of operation according to said selection of said data bus transfer switch, and
   a second system check module responsive to said second data input-output bus having a first output signal controlling the selection of said second data bus transfer switch and having a second output signal informing said first computer of the mode of operation according to the selection of said data bus transfer switch.

3. A high-reliability computer system for controlling and monitoring an industrial process comprising:
   a first computer having a first input-output facility,
   a first data input-output bus electrically interconnected with said first input-output facility of said first computer and having a first set of data input and data output modules interconnected therewith including a first valve output signal module having a first set of valve outputs for non-critical process valves and having a second set of valve outputs for critical process valves,
   a second computer having a second input-output facility, a second data input-output bus electrically interconnected with said second input-output facility of said second computer and having a second set of data input and data output modules interconnected therewith including a second valve output signal module having a first set of valve outputs for non-critical process loops and having a second set of valve outputs for critical process valves,
   a first gating means responsive to said second set of valve outputs from said first valve output module having a first set of controlled outputs to said critical process valves, a second gating means responsive to said second set of valve outputs from said second valve output module having a second set of controlled outputs to said critical process valves, a first system check module responsive to said first data input-output bus having an output signal controlling said second set of controlled outputs of said second gating means, and
   a second system check module responsive to said second data input-output bus having an output signal controlling said first set of controlled outputs of said first gating means.

4. The system of claim 3 wherein:
said first system check module has a second output signal informing said second computer of the mode of operation appropriate to the condition of said second gating means, and
said second system check module has a second output signal informing said first computer of the mode of operation appropriate to the condition of said first gating means.

References Cited
UNITED STATES PATENTS

| | | | |
|---|---|---|---|
| 2,945,915 | 7/1960 | Strip | 178—69 |
| 3,252,149 | 5/1966 | Weida et al. | 340—172.5 |
| 3,303,474 | 2/1967 | Moore et al. | 340—172.5 |

ROBERT C. BAILEY, *Primary Examiner.*

R. B. ZACHE, *Assistant Examiner.*